(12) United States Patent
Otto

(10) Patent No.: US 6,210,164 B1
(45) Date of Patent: Apr. 3, 2001

(54) MOTION SIMULATOR

(76) Inventor: Stefan Otto, Steinkamp 15, Dörentrup (DE), D-32694

( * ) Notice: Subject to any disclaimer, the term of this patent is extended or adjusted under 35 U.S.C. 154(b) by 0 days.

(21) Appl. No.: 09/297,880

(22) PCT Filed: Sep. 3, 1998

(86) PCT No.: PCT/EP98/05583

§ 371 Date: Jul. 6, 1999

§ 102(e) Date: Jul. 6, 1999

(87) PCT Pub. No.: WO99/13445

PCT Pub. Date: Mar. 18, 1999

(30) Foreign Application Priority Data

Sep. 9, 1997 (DE) .............................. 297 16 148

(51) Int. Cl.⁷ .............................. G09B 9/08; G09B 19/16
(52) U.S. Cl. .............................. 434/55; 434/29; 434/58; 472/130
(58) Field of Search .............................. 434/29, 43–45, 434/55–59, 62, 69, 307 R, 365; 472/1, 2, 30, 31, 36, 59, 60, 130; 463/46; 73/865.3; 74/471 Y; 318/567; 320/101; 307/43

(56) References Cited

U.S. PATENT DOCUMENTS

| 3,196,557 | * | 7/1965 | Davidsen et al. | 434/55 |
|---|---|---|---|---|
| 3,829,988 | * | 8/1974 | Burny | 434/58 |
| 4,343,610 | * | 8/1982 | Chou | 434/58 |
| 4,461,470 | * | 7/1984 | Astroth et al. | 472/60 |
| 4,478,407 | * | 10/1984 | Manabe | 472/60 |
| 4,551,101 | * | 11/1985 | Neumann | 434/55 |
| 4,753,569 | * | 6/1988 | Hart et al. | 434/29 |
| 5,015,933 | * | 5/1991 | Watkins et al. | 318/567 |
| 5,490,784 | * | 2/1996 | Carmein | 434/55 |
| 5,533,933 | * | 7/1996 | Garnjost et al. | 472/60 |
| 5,644,204 | * | 7/1997 | Nagle | 320/101 |
| 5,669,773 | * | 9/1997 | Gluck | 434/62 |
| 5,688,179 | * | 11/1997 | Ohishi | 472/59 |
| 5,752,834 | * | 5/1998 | Ling | 434/58 |
| 5,954,508 | * | 9/1999 | Lo et al. | 434/55 |

FOREIGN PATENT DOCUMENTS

| 2225804 | 2/1979 | (DE) . |
|---|---|---|
| 0628940 | 6/1974 | (EP) . |
| 0137870 | 1/1987 | (EP) . |
| 2745656 | 9/1997 | (FR) . |
| WO9410665 | 5/1994 | (WO) . |

* cited by examiner

*Primary Examiner*—Joe H. Cheng
(74) *Attorney, Agent, or Firm*—Richard M. Goldberg

(57) ABSTRACT

A motion simulator comprises a cabin (10) which is supported on the ground (14) by at least three feet (12). Each of the feet can swivel about an essentially horizontal axis, the cabin (10) having a swivel drive (26) for each foot. Each foot (12) bears a wheel (30) by which it rolls along the floor (14).

5 Claims, 3 Drawing Sheets

MOTION SIMULATOR

BACKGROUND OF THE INVENTION

The invention relates to a motion simulator comprising a cabin which is supported on the ground by at least three legs that are each pivotable about a horizontal axis, and a pivotal drive for each leg.

Motion simulators are frequently used as flight or drive simulators, for example as a training device in the training of pilots, or else as a game apparatus in the amusement industry. The basic principle of such motion simulators consists of tilting the cabin about a longitudinal axis and/or a transverse axis, in order to utilise gravity for simulating the forces of inertia associated with acceleration, braking or driving through curves. Thus, the cabin must be suspended such that it can perform movements within a certain range in at least two, preferably three or more degrees of freedom.

Commonly used are suspensions employing so-called hexapodes which enable a movement in all six degrees of freedom but have a very complex construction and require a complex control. In addition, these suspensions have the drawback that the hexapodes must be stably anchored in the ground and are relatively bulky, so that a correspondingly large installation area is required and the cabin must have a comparatively large entry height.

EP-B-0 137 870 discloses a motion simulator of the type indicated above, in which the cabin is suspended at three legs having a T-shaped configuration in plan view. Each leg is configured as a pair of scissors and has a substantially vertical arm which is supported on the ground and the upper end of which is connected through a substantially horizontal hinge axis with a substantially horizontal arm the free end of which is again pivotally connected to the cabin. A drive cylinder serving as pivotal drive is associated with each leg, so that the opening angle of the scissors and hence the height of the corresponding pivotal joint of the cabin above the ground can be varied. Thus, three degrees of freedom are made possible, namely rotations about the longitudinal axis and the transverse axis as well as translations in vertical direction. Although this construction permits to lower the cabin in order to reduce the entry height, it has the drawback that a relatively complex construction of pivotal joints is required. In addition, the movements of the two legs opposing each other must be coordinated such that the pivotal axis of the third leg always maintains its orientation in spcae. This requires a complex control. Since the pivotal axes of the three legs are always in parallel with the bottom surface and, in addition, the two parallel pivotal axes of the legs that are opposing each other are always perpendicular to the pivotal axis of the third leg, the cabin cannot make translational movement in the horizontal plane.

SUMMARY OF THE INVENTION

It is an object of the invention to provide a motion simulator of the type indicated above which has a simple construction, can be controlled easily and nevertheless permits a realistic simulation of motion.

According to the solution, each leg carries a wheel with which it rolls on the ground.

When the cabin of the motion simulator according to the invention is to be lowered at one of the three supporting points, it is only necessary to appropriately pivot the leg connected to this supporting point relative to the cabin, with its wheel rolling on the ground. Then, the entire motion simulator makes a tilting movement about the axis which is defined by the contact points of the two other wheels with the ground. Thus, by pivoting the three legs, a movement in three degrees of freedom is possible. These degrees of freedom which are defined by the pivotal angles of each leg relative to the cabin can be varied completely independently from one another, so that a very simple and robust control is made possible. The articulated connections between the cabin and the legs need not be ball joints or universal joints but can simply be formed by hinges, so that a very simple and robust construction of the motion simulator is achieved.

When all three legs are brought into an approximately horizontal position, the cabin is lowered almost to the ground, so that a very low entry height is achieved and, accordingly, no ladders or the like are needed for entering into or exiting out of the cabin. By synchronously pivoting all three legs, the cabin can be moved in vertical direction, so that short term vertical accelerations such as, for example, road bumps or the like can also be simulated.

During the simulation of motion, the cabin is normally in a lifted position above the ground. Since, when the cabin is tilted by varying one degree of freedom, the pivotal axis is on ground level, such pivotal movement of the cabin is also accompanied by a slight translation in horizontal direction. This is very favourable for creating a realistic feeling of motion.

Another advantage of the invention consists of the fact that the motion simulator need not be rigidly anchored in the ground but can easily be installed on any horizontal ground surface.

Another solution is based on the same function principle and differs from the solution described above only in that one of the legs is stationarily supported on the ground through a disc shaped foot whereas the other legs are provided with self-steering roll assemblies, so that they may roll on the ground in any direction. In this context, the term "self-steering roll assembly" means any suitable arrangement which is capable on rolling on the ground in any direction and wherein the axes of rotation of the roll bodies (wheels or balls) adjust themselves in accordance with the respective direction of movement of the lower end of the associated leg. For example, the self-steering roll assembly may be formed by a single trailing roller or by a set of several trailing rollers. As an alternative, the roll body may be formed by a ball that is mounted to be rotatable in all directions.

While, in the embodiment according to claim 1, the center of mass of the motion simulator always remains above the same point on the ground and all legs move relative to the projection of the center of mass onto the ground surface, the disc shaped foot remains stationary in the embodiment according to claim 4, and the other legs move relative to this disc shaped foot.

Useful details of the invention are specified in the dependent claims.

Preferably, the pivotal axis of each leg is non-parallel with the pivotal axis of both other legs. As a result, the directions in which the wheels mounted to the three legs roll are also different from one another, so that the motion simulator cannot be displaced in any direction on the ground, as long as all three wheels are in contact with the ground.

Thus, even in operation, a "shifting" of the motion simulator is avoided. In a particularly preferred embodiment the three legs are mounted to the cabin in a star-shaped manner in angular intervals of 120°.

The wheels may have rubber tires, so that a slip-free support on the ground is assured and at the same time a certain attenuation if vibrations is achieved.

The pivotal drives for the legs are preferably formed by drive cylinders that are articulated between the cabin and the respective leg. Alternatively or additionally, drives for the wheels of the three legs may be provided as pivotal drives.

By means of sensors which detect the position of each leg relative to the cabin and may for example be integrated in the pivotal drives, it is possible at any time to detect the actual posture of the cabin in space in real time, so that the control receives a feedback on the changes of posture that have been effected. Alternatively or additionally it is possible to detect the orientation of the cabin by means of a gravity sensor or by satellite goniometry. The height of the cabin over ground can for example be monitored by means of an ultrasonic distance meter Finally, it is also possible to detect all data on the posture in space by means of a GPS system.

BRIEF DESCRIPTION OF THE DRAWINGS

A preferred embodiment will be described below in conjunction with the drawings, wherein.

DETAILED DESCRIPTION

Figure 1:
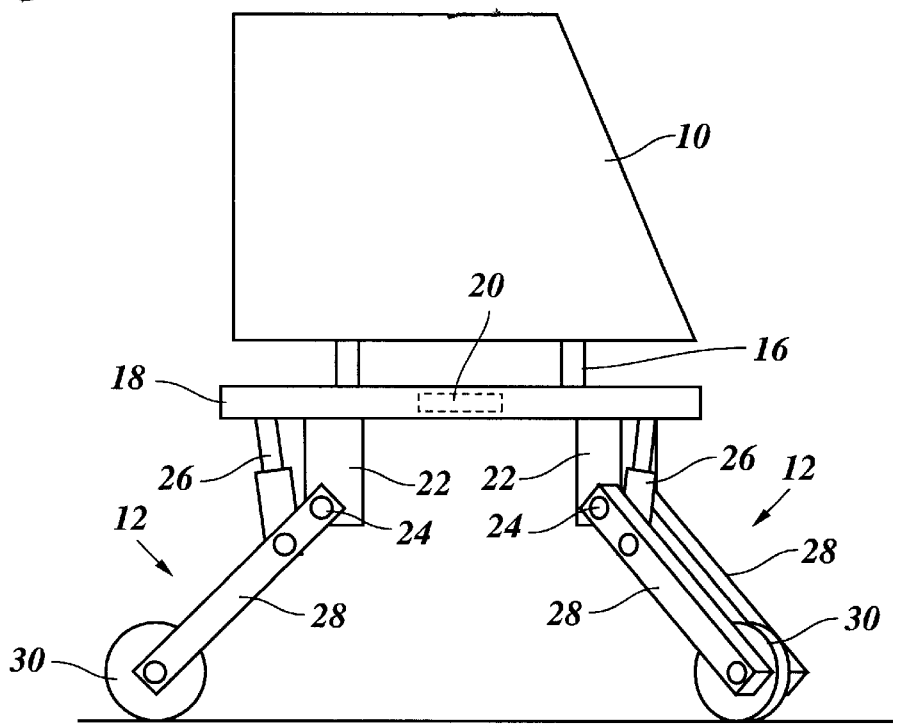
FIG. 1 is a schematic side elevation of a motion simulator in a normal posture.
Figure 2:
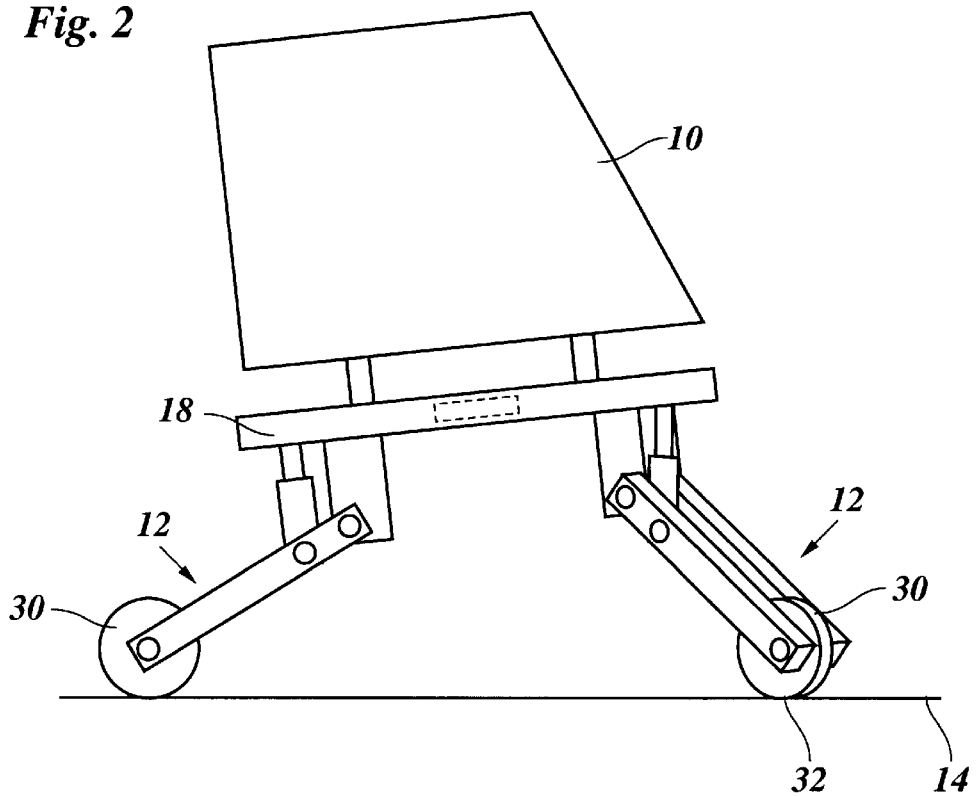
FIG. 2 is an elevation of the motion simulator in tilted posture.
Figure 3:
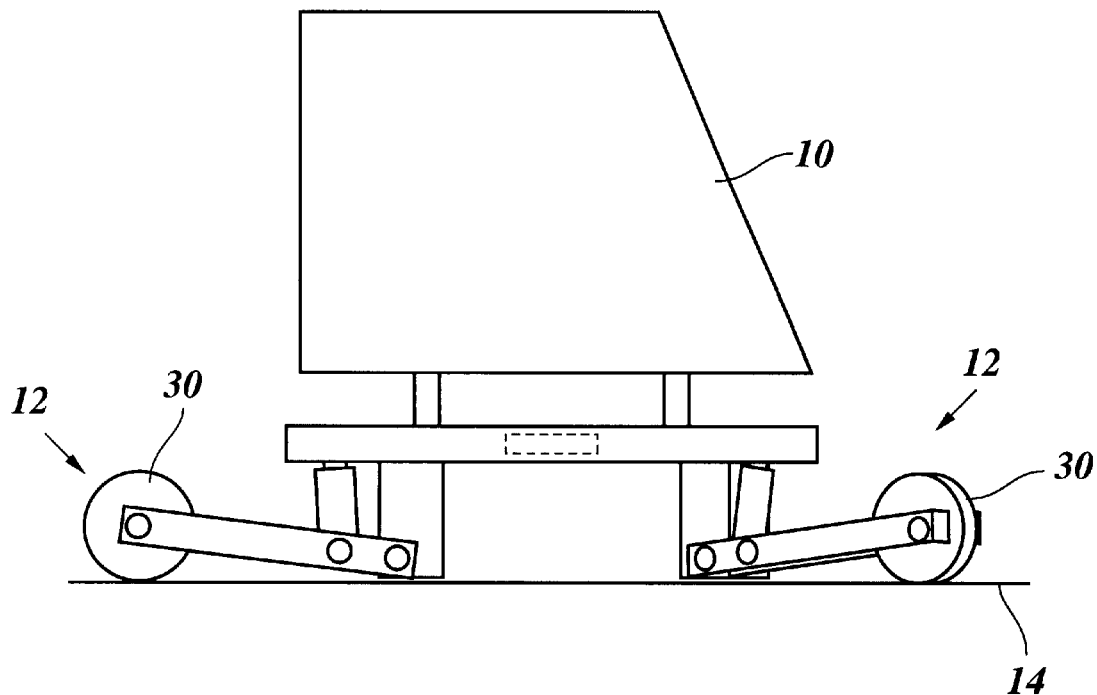
FIG. 3 is an elevation of the motion simulator in a lowered entry position.

The motion simulator shown in FIG. 1 has a cabin 10 which is supported on the ground 14 through three legs 12. The three legs 12, only two of which can be seen in FIGS. 1 to 3, are arranged in a star-shaped configuration at angular intervals of 120° around the center of the cabin, when seen from above as in FIG. 4.

In the example shown, the cabin 10 is rigidly mounted, by means of pillars 16, on a platform 18 which has an integrated gravity sensor 20 for measuring the current inclination of the platform 18 and hence the cabin 10. On its bottom side the platform 18 has three mounting blocks 22 to each of which one of the legs 12 is articulated by means of a hinge 24. As a pivotal drive there is provided for each leg a pneumatic or hydraulic drive cylinder 26 which has one end articulated to the leg 12 and another end articulated to the platform 18. The articulated connections at both ends of each drive cylinder 26 may also be formed by simple hinges. Instead of a drive cylinder, another pivotal drive, for example an electric motor or the like could be used.

In the example shown each leg 12 is formed by two parallel arms 28, and the associated mounting block 22 and the drive cylinder 26 are intervening therebetween. At the lower end, each leg carries a wheel 30 which is rotatably supported between the arms 28, so that it may roll on the ground 14.

Each of the hinges 24 defines a pivotal axis which extends in a plane parallel to the platform 18 and perpendicular to the associated leg 12. Thus, in the normal posture shown in FIG. 1, in which the platform 18 is oriented horizontally, the axes defined by the hinges 24 are also horizontal. The axis of each wheel 30 is parallel with the axis of the associated hinge.

When one of the legs 12 is pivoted, as for example the left leg 12 in FIG. 2, the lower end of this leg, which is rollingly supported on the wheel 30, moves radially outward or inward. As a result, the motion simulator as a whole tilts about an axis which extends in the plane of the ground surface 14 and passes through the ground contact points 32 defined by the two other wheels 30. By combining pivotal movements of all three legs 12, the cabin 10 can be tilted in any desired direction.

In addition, the cabin 10 may be adjusted in height by synchronously pivoting all three legs 12. As an example, FIG. 3 shows the condition in which the cabin 10 has been lowered to a maximal extent, so that one may conveniently enter into the cabin or exit therefrom.

The motion simulator according to the invention can, without substantial preparation work, be installed on any flat bottom surface 14 and is mobile to be transported to the desired location where it is to be operated. To this end, it is sufficient to lift two of the three legs 12, so that the motion simulator may be displaced while rolling on the wheel 30 of the third leg.

Figure 4:
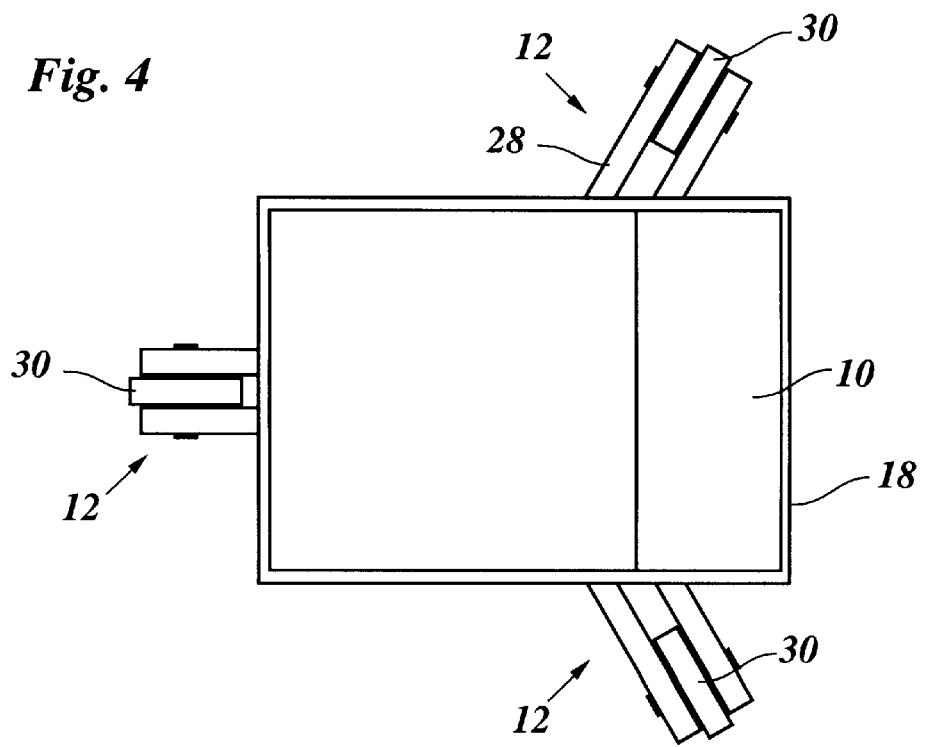
FIG. 4 is a plan view of the motion simulator.

As is shown in FIG. 4, the legs 12 may be so arranged under the platform 18 that, on the one hand, a sufficient stability is assured and, on the other hand, only a comparatively small installation area is required. If desired, the legs 12 may also be telescoping, so that they can be retracted when the cabin 10 is lowered to the position shown in FIG. 3. In this case, the required installation area is reduced further.

Additional degrees of freedom of the movement may for example be realised by replacing the rigid pillars 16 in FIG. 1 by a X-Y-drive and/or a rotary drive, so that, in the extreme case, a movement in all six degrees of freedom is made possible.

Figure 5:
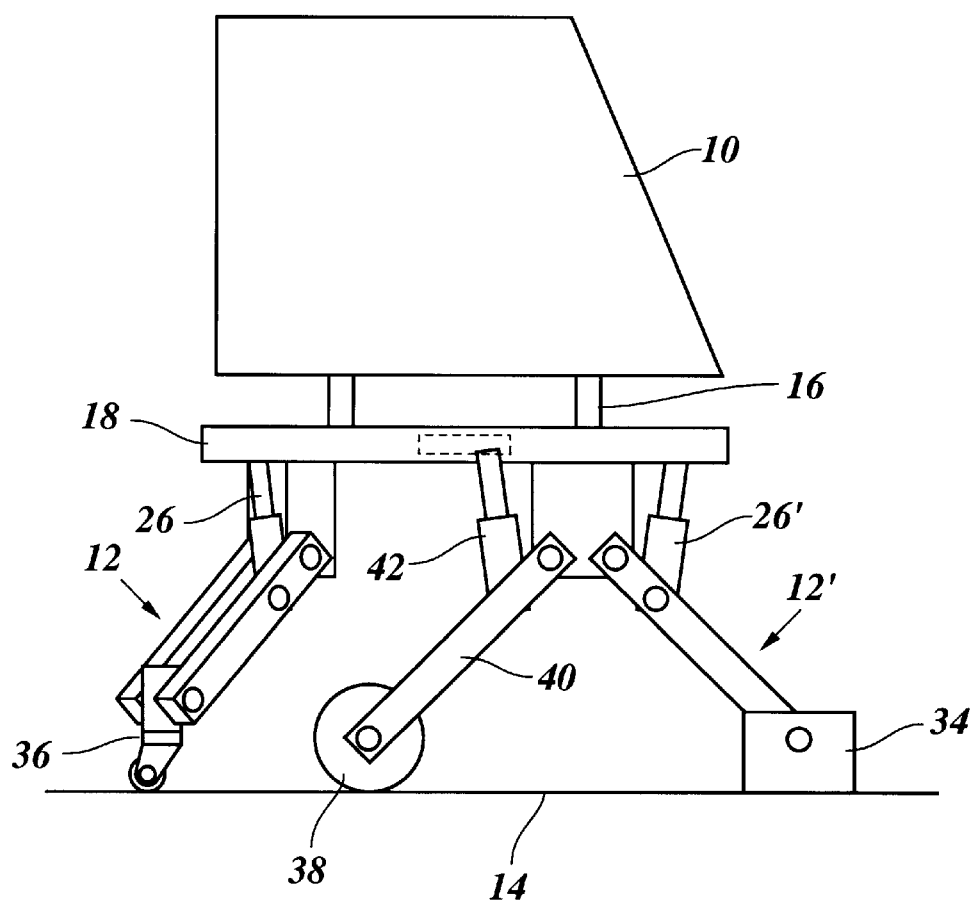
FIG. 5 shows a motion simulator according to a modified embodiment.

FIG. 5 shows a motion simulator according to a modified embodiment, in which one leg 12', preferably the leg, which extends in the vertical median plane of the cabin 10, has a disc shaped foot 34 instead of a wheel, so that it is stationarily supported on the ground.

The two other legs 12 which, when seen from above, each form an angle of 120° with the leg 12' carry and at their free end a self-steering roll assembly 36 which in the shown embodiment is formed by a single trailing roller. Thus, the legs 12 are capable of rolling on the ground 14 in any direction.

With the motion simulator according to the FIG. 5, in principle, the same movements as in the previously described embodiment can be simulated, with the only difference that it is not the projection of the center of mass of the motion simulator on the bottom surface 14, but the disc shaped foot 34 that remains stationary. If, for example, the rear end of the cabin 10 is lowered (the left end in FIG. 5), then the corresponding drive cylinders 26 are retracted simultaneously. The self-steering roll assemblies 36 then move on the ground 14 on tracks in parallel with the longitudinal axis of the motion simulator. If, on the other hand, the cabin 10 is held in a horizontal position and is lowered evenly, then all drive cylinders 26 and 26' are retracted simultaneously. In this case, the self-steering roll assemblies 36 move radially relative to the disc shaped foot 34.

In this embodiment, any "shifting" of the motion simulator is prevented by the disc shaped foot 34 which is stationary relative to the ground 14.

In place of a single trailing roller, the self-steering roll assembly 36 may also be formed by a set of several trailing rollers that are mounted on a common base plate which itself is articulated to the leg 12. Thus, the load on the individual trailing rollers is reduced, so that, for the same weight, a more compact construction of the trailing rollers is possible. At the same time, the trailing rollers may respond more quickly to steering movements when the direction of displacement of the lower ends of the legs 12 changes.

In place of trailing rollers, equivalent devices may be provided, for example a ball that is supported in a socket by means of small bearing balls so as to be rotatable in any direction.

For achieving an additional stabilisation, there Is provided in the shown embodiment a guide roller 38 which is mounted to the lower end of a pivotable arm 40 such that it always rolls on the ground 14 in the direction of the longitudinal axis of the motion simulator. In this case, the arm 40 is pivotable in the same vertical plane as the leg 12' and is always biased against the ground by a cylinder 42, a gas spring or other elastic means. In this way, a rotating movement of the motion simulator around the vertical axis passing through the disc shaped foot 34 is prevented reliably.

What is claimed is:

1. A motion simulator for installation on a ground surface, said motion simulator comprising:

a cabin;

at least three legs, each of which is pivotally mounted to the cabin and has a substantially horizontal pivotal axis; and a pivotal drive for each of said legs, wherein each leg has a wheel arranged to roll on the ground surface.

2. A motion simulator according to claim 1, wherein said pivotal axis of each leg is non-parallel to the pivotal axis of each of the other legs.

3. A motion simulator according to claim 2, wherein three said legs are arranged, as seen in plan view, in a star-shaped configuration at angular intervals of 120°.

4. A motion simulator for installation on a ground surface, said motion simulator comprising:

a cabin;

at least three legs, each of which is pivotally connected to said cabin and has a substantially horizontal pivotal axis; and a pivotal drive for each of said legs, wherein one of said legs has a stationary foot with which it is supported on the ground surface, said leg being pivotable in a vertical plane, and wherein the other legs are arranged symmetrically relative to said vertical plane and each has a self-steering roll assembly with which it is supported on the ground surface.

5. A motion simulator according to claim 4, further comprising an arm which is articulated to said cabin to be movable in said vertical plane, a guide roller mounted to said arm for supporting the same on the ground surface, and a biasing device connected to the arm and biasing said arm and said guide roller against the ground.

* * * * *